United States Patent [19]

Gnutov et al.

[11] Patent Number: 4,502,310

[45] Date of Patent: Mar. 5, 1985

[54] CONVEYOR ROLLER AND METHOD OF MANUFACTURE THEREOF

[75] Inventors: Anatoly N. Gnutov, Moscow; Boris S. Golberg, Nikolaev; Nadezhda N. Zelenskaya, Kramatorsk; Vladimir G. Kaporovich, Kramatorsk; Vladimir V. Kaporovich, Kramatorsk; Varlen K. Pirogov; Jury V. Romanov, both of Moscow; Viktor G. Sereda, Kramatorsk; Jury P. Sidorov, Moscow; Vitaly K. Udovenko, Kramatorsk; Aron N. Tsoglin, Moscow, all of U.S.S.R.

[73] Assignee: Gosudarstvenny Proektny I Konstruktorsky Institut Sojuzprommekhanizatsia, Moscow, U.S.S.R.

[21] Appl. No.: 253,524

[22] PCT Filed: Jul. 9, 1979

[86] PCT No.: PCT/SU79/00054

§ 371 Date: Mar. 9, 1981

§ 102(e) Date: Mar. 9, 1981

[87] PCT Pub. No.: WO81/00094

PCT Pub. Date: Jan. 22, 1981

[51] Int. Cl.³ .............................................. B21H 1/00
[52] U.S. Cl. .......................................... 72/69; 72/80
[58] Field of Search ................... 72/68, 69, 80, 82, 83, 72/84, 85, 356, 377, 81; 228/60; 474/197; 29/129.5, 148.4 D, 159 R, 159.3

[56] References Cited

U.S. PATENT DOCUMENTS

| 2,406,059 | 8/1946 | Burch ........................................ 72/69 |
| 2,671,348 | 3/1954 | Moore .................................. 29/159 R |
| 2,882,851 | 4/1959 | Graves ........................................ 72/85 |
| 3,496,747 | 2/1970 | Delmer et al. ........................... 72/81 |

FOREIGN PATENT DOCUMENTS 2542634  4/1977  Fed. Rep. of Germany ........ 72/356

Primary Examiner—Lowell A. Larson
Attorney, Agent, or Firm—Lilling & Greenspan

[57] ABSTRACT

A conveyor roller wherein a hollow cylindrical shaft 1 with perpendicular end walls 2 carries axle shafts 3 for mounting the bearings. The end walls 2 and axle shafts 3 are made integral with the hollow cylindrical shell 1, the end walls 2 being of a variable thickness which grows into the cylindrical shell 1 in the direction from its periphery to the geometrical axis.

A method of manufacture of the conveyor roller wherein the ends of the rotating tubular billet heated to a forging temperature are rolled consecutively until truncated cones are obtained, the smaller base of each cone being somewhat larger than the diameter of the roller axle shaft 3, then, continuing the rolling of each end, the axle shaft 3 and the end wall 2 of the roller are simultaneously formed in the direction from the smaller base of the truncated cone to its larger base, the end wall of the roller being of a variable thickness which grows radially into the cylindrical shell 1 from the periphery to its geometrical axis.

2 Claims, 8 Drawing Figures

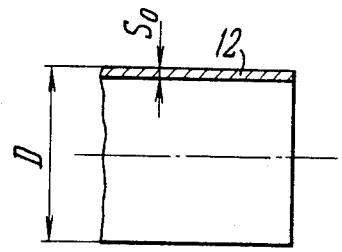
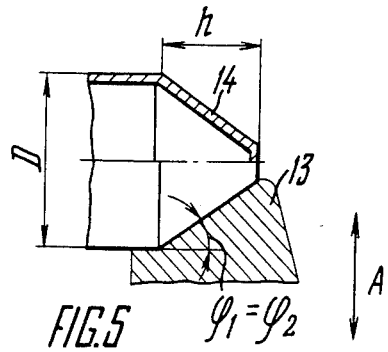
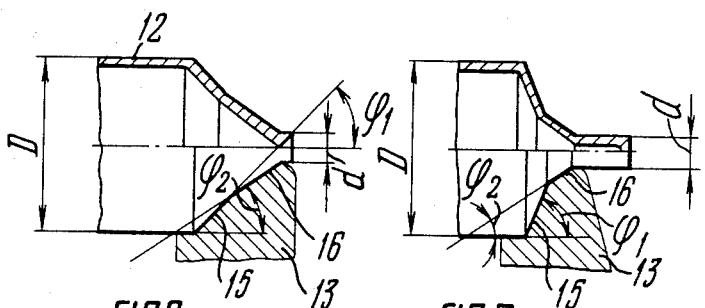
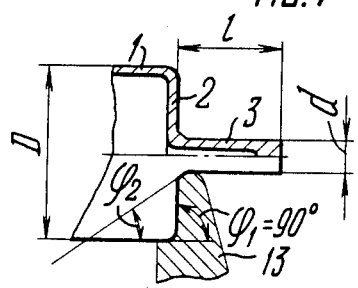

CONVEYOR ROLLER AND METHOD OF MANUFACTURE THEREOF

BACKGROUND OF THE INVENTION

1. Technical Field

The present invention relates to hoisting and conveying machine building and more particularly it relates to conveyor rollers and a method of manufacture thereof.

2. Background Art

The conveyor rollers known in the prior art comprise a hollow cylindrical shell which has consecutively arranged tapered and cylindrical portions at both ends thereof. The cylindrical end portions serve as axle shafts for mounting the bearings (see, for example, FRG Pat. No. 2413270 published Jan. 9, 1975).

This roller is intended for special applications of conveyors, i.e. in furnaces which determines the peculiarities of its design. It is made of a tubular billet and all its component parts, i.e. the hollow cylindrical shell, tapered portions and cylindrical axle shafts are made as an integral unit. The roller walls in all cross sections have the same thickness which is equal to the thickness of the tubular billet. The transition from the cylindrical portion of the shell to the axle shafts via tapered portions permits the roller to pass through the furnace walls which increases the distance between the bearings. The interior space of the roller is open and not sealed which is required for cooling the roller.

Another widely known roller comprises a hollow cylindrical shell, end walls which are perpendicular to the shell, and axle shafts for mounting the bearings. The end walls mostly made of steel plate are inserted into the bores of the cylindrical shell which is made of a tubular billet and are connected to said shell by welding, rolling-in or by some other type of joint suitable for the purpose. Solid axle shafts are also connected to the end walls, usually by welding.

Such a roller is labour-consuming in manufacture, insufficiently reliable in service due to frequent failures of the joint between the hollow cylindrical shell and the end walls and between the end walls and the axle shafts. The end walls made of steel plate have the same thickness in all cross sections so that the construction is not uniform in strength. The initial thickness of the walls of the tubular billet for making the hollow cylindrical shell has to be increased for making the recesses to receive the end walls. All these factors increase the consumption of metal during roller manufacture, the weight of the rotating masses, and the consumption of power during conveyor operation. The manufacture of such rollers calls for a considerable stock of machine tools and, consequently, comparatively large production floor areas.

Known in the prior art is a method of manufacturing conveyor rollers by the consecutive rolling of the ends of a tubular billet heated to a forging temperature. In this rolling operation a bar with a thicker portion is inserted into the tubular billet in the zone of its heated ends and, when said thicker portion of the bar is wedged after forming the outside diameter in the beginning of the axle shaft, the bar is moved axially from the billet, thus drawing the axle shaft and simultaneously cooling it with, say, water (see USSR Author's Certificate No. 553780, Cl.B21D 41/02). The known method is adapted only for manufacturing elongated axle shafts whose walls are thinner than the wall of the billet.

Another prior art method of making rollers with an axle shaft by rolling consecutively the ends of the tubular billet heated to a forging temperature and rotated during rolling (see USSR Author's Certificate No. 339337, Cl. B21D 41/04). However, this method fails to produce rollers wherein the end walls and axle shafts are made integral with the cylindrical shell and wherein the thickness of the end walls varies, growing into the cylindrical shell in the direction from its periphery to the geometrical axis.

SUMMARY OF THE INVENTION

The main object of the invention is to provide a conveyor roller and a method of manufacture thereof ensuring enhanced reliability and service life in the process of operation, as well as reduced metal consumption in manufacture thereof. Said object is attained in a conveyor roller wherein the hollow cylindrical shell with perpendicular end walls carries axle shafts for mounting the bearings. According to the invention, the end walls and the axle shafts of the roller are made integral with its cylindrical shell, said end walls having a variable thickness which grows into the cylindrical shell in the direction from its periphery towards the geometrical axis.

It is practicable that the maximum thickness of the end wall at the point of transition into the axle shaft should be smaller than or equal to half the axle shaft diameter.

Such a thickness of the wall ensures the optimum uniformity of stress distribution therein.

It is no less practicable that the butt of each axle shaft should be made blind and integral with the axle shaft.

Such rollers are indispensable for conveyors used under the conditions where the roller metal is corroded.

Disclosed herein is a method of manufacturing a conveyor roller comprising a hollow shell with end walls and axle shafts for mounting the bearings by consecutively rolling the ends of a rotating tubular billet heated to a forging temperature wherein, aaccording to the invention, each end of the tubular billet is rolled to produce a truncated cone whose smaller base is somewhat larger than or equal to the required diameter of the roller axle shaft then, continuing gradually to roll this end, the axle shaft is formed in the direction from the smaller base of the truncated cone to its larger base and, simultaneously, the end wall of the roller is also formed so that it has a variable thickness growing radially into the cylindrical shell from the periphery to its geometrical axis.

It is practicable that the truncated cone should be rolled by forming simultaneously two tapered portions whose generatrices are set at different angles to the geometrical axis of the tubular billet and which vary in length in the course of rolling, the process of forming including gradual change in the angle of inclination of the generatrix of at least one of these portions to the geometrical axis of the tubular billet.

It is possible to change gradually to 90° the angle of inclination of the generatrix of the tapered portion adjoining the non-formed portion of the tubular billet from the inclination angle of the generatrix of the truncated cone, leaving the angle of inclination of the generatrix of the other tapered portion unchanged and equal to the angle of inclination of the generatrix of the truncated cone.

Forming the ends of the tubular billet at two portions with the above-disclosed angles of the generatrices of these portions ensures a stable process of forming without severing the axle shaft from the cylindrical shell and with the desired distribution of metal over the rolled portions of the billet.

The disclosed conveyor roller and the method of manufacture thereof reduce considerably the metal consumption during manufacture, the power requirement in service, ensure uniform strength of the structure, increase the service life and reliability of the roller and reduce the amount of labour required for its manufacture.

BRIEF DESCRIPTION OF THE DRAWINGS

Now the invention will be described in detail by way of example with reference to the accompanying drawings.

FIG. 4 illustrates the tubular billet;

FIG. 5 shows the initial taper on the end of the tubular billet; and

FIGS. 6 through 8 illustrate the consecutive stages of forming the axle shaft and the end wall of the roller.

DESCRIPTION OF THE PREFERRED EMBODIMENT

Figure 1:
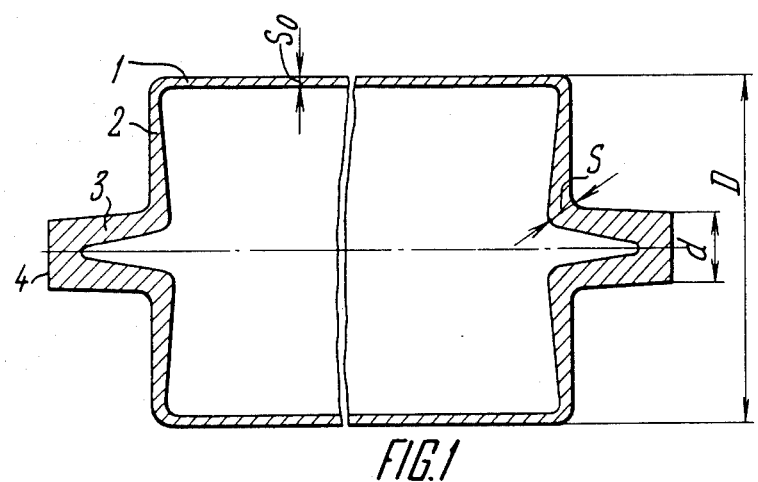
FIG. 1 is a longitudinal section through the conveyor roller according to the invention.

The conveyor roller comprises a hollow cylindrical shell 1 (FIG. 1) closed at two sides with end walls 2 merging into axle shafts 3 with blind butts 4. The external surface of the end walls 2 is perpendicular to the geometrical axis of the roller. The walls 2 have a variable thickness growing from the cylindrical portion of the shell 1 towards the axle shaft 3 into the shell 1. The thickness of the wall changes from the initial thickness $S_o$ of the shell 1 to the maximum thickness S at the transition of the end wall 2 into the axle shaft 3

$$S \leq d/2$$

where d=diameter of axle shaft 3.

The end walls 2 and axle shafts 3 are made from the tubular billet integral with the roller shell 1.

Figure 2:
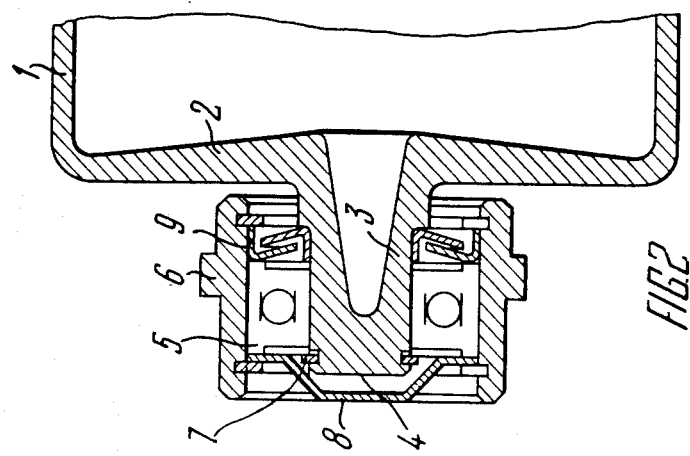
FIG. 2 shows the bearing assembly of the roller with the bearing secured by a lockring.

When the roller is installed on the conveyor, its axle shafts 3 rest on bearings 5 (FIG. 2), each bearing being located in a housing 6 and secured on the axle shaft 3 by a lockring 7. The housing 6 is closed by a cover 8; the opposite side of the bearing 5 is provided with a seal 9.

Such a roller with blind butts 4 on the axle shafts 3 has the inside space completely isolated from the ambient medium and thus requiring no anticorrosion protection. Such rollers are installed on conveyors working in aggressive media.

Figure 3:
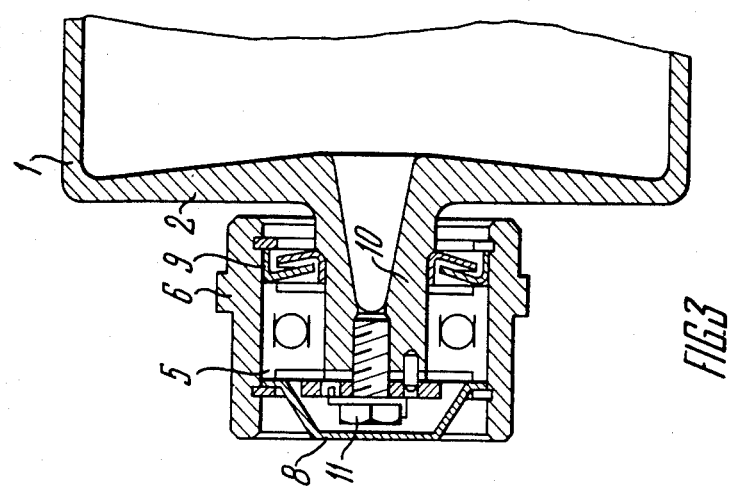
FIG. 3 shows the bearing assembly of the roller with the bearing secured by a screw.

The bearing 5 may be secured on the axle shaft 10 (FIG. 3) by a screw 11 for which purpose the butt of the axle shaft 10 is provided with a threaded hole.

Such rollers are used with conveyors working in nonaggressive media.

The above-described roller is made from a tubular billet 12 (FIG. 4) by rolling consecutively its ends. The ends of the tubular billet are heated to a forging temperature of 1000°–1200° C. Then the tubular billet 12 is rotated around its longitudinal axis, for example in the chuck of a turning lathe at a speed of 400 to 1000 rpm depending on the dimensions of the tubular billet 12, its diameter D and wall thickness $S_o$ and rolled with a calibrated friction tool 13 (FIG. 5) until an initial truncated cone 14 is obtained, the smaller base of said cone being larger than or equal to the required diameter d of the roller axle shaft 3 (FIG. 1). The height h of the truncated cone 14 (FIG. 5) should correspond to the length of the axle shaft 3 (FIG. 1) and the thickness of the end wall 2. After rolling the truncated cone 14 (FIG. 5) the tool 13 is reciprocated as shown by arrow A at a speed of 5 to 15 mm/s square to the axis of the tubular billet 12 so that the moving tool 13 contacts the heated end of the billet and forms it.

The axle shaft 3 (FIG. 1) which joins the hollow cylindrical shell 1 by the end wall 2 is produced on the end of the tubular billet 12 (FIG. 2) by continuing to roll the truncated cone and forming simultaneously the axle shaft 3 and the end wall 2 in the direction from the smaller base of the truncated cone to its larger base, the thickness of the end wall growing radially into the cylindrical shell from the periphery to its geometrical axis.

The truncated cone 14 is rolled by forming simultaneously two tapered portions 15 and 16 (FIGS. 6, 7) whose generatrices are set at different angles respectively $\phi_1$ and $\phi_2$ to the geometrical axis of the tubular billet 12 and vary in length gradually in the course of rolling. The length of the generatrix of the tapered portion 16 changes from a maximum to a minimum while the length of the tapered portion 15 changes from a minimum to a maximum equal to $D-d/2$. In the course of forming the inclination angle $\phi_1$ of the generatrix of the tapered portion 15 to the geometrical axis of the tubular billet 12 is gradually changed, said portion adjoining the non-formed portion of the tubular billet. The angle $\phi_1$ is changed from the angle equal to the inclination angle of the generatrix of the truncated cone 14 to 90° (FIG. 8). In the course of forming the inclination angle $\phi_2$ of the generatrix of the other tapered portion 16 is left unchanged and equal to the inclination angle of the generatrix of the truncated cone 14.

While the end wall 2 (FIG. 1) is being formed, there is a heavy displacement of metal in the zones adjoining the axle shaft 3 which increases the thickness of the end wall 2 in the direction from the periphery of the shell 1 towards the axle shaft 3. Gradually, the formed portions of the axle shaft 3 come out of the zone of contact with the tool 13 (FIGS. 5–8). The end wall 2 and the axle shaft 3 are rolled in one pass of the tool 13. On completion of rolling the tool 13 returns to the initial position. The above-described method is capable of producing an axle shaft 3 wherein the ratio of the diameter d of the axle shaft 3 to the initial diameter D of the tubular billet 12 is $d/D < \frac{1}{4} - 1/6$ and the length l is not less than the billet diameter ($l/d > 1$).

Such relations between the geometrical dimensions of the axle shaft 3 and end wall 2 can be obtained only by the disclosed method.

The produced axle shaft 3 whose length l is larger than two diameters d is sufficient for mounting the bearings and the requisite sealing and locking devices of the bearing assembly. The ratio of the diameter of the axle shaft 3 to the diameter of the hollow cylindrical shell 1 $d/D < \frac{1}{4} - 1/6$ ensured in the roller according to the present invention is an optimum one from the viewpoint of obtaining the minimum coefficient of resistance to rotation of the roller, its minimum power requirement and metal consumption during manufacture. The roller shell 1, its end walls and axle shafts are made from a single tubular billet, have no joints between the end wall and the hollow cylindrical shell and between the axle shaft and the end wall which steps up the reliability and prolongs the life of the roller. The absence of joints dispenses with the necessity of machining the tubular billet, end wall and axle shaft. This gives an additional saving in metal since there is no metal wasted for machining of parts and cutting out the end wall on the one hand and since the thickness of the billet wall is reduced (by the value of allowance for boring out) on the other. The latter fact makes it possible additionally to reduce the weight of the rotating parts and, consecutively, the power requirement of the roller. The varying thicknesses of the end walls along the section of the roller make for rational distribution of the metal and for obtaining a construction of uniform strength by increasing the thickness of the end wall in correspondence with the increase in the force factors in the direction from the periphery of the hollow cylindrical shell to the geometrical axis of the roller.

An experimental batch of rollers 108 mm in diameter, 250 and 750 mm long was made in accordance with the present invention for belt conveyors with the belt width B=650 mm. The rollers were made by the abovedescribed method from tubular billets 108 mm in diameter with a wall thickness of 3 mm. The axle shaft machined for the bearing is 17 mm in diameter ($d/D = 17/108 \approx 1/6.4$) and about 35 mm long ($l/d > 2$). The axle shaft is solid at the end. The thickness of the end wall changes from 3 mm at the point of transition from the hollow cylindrical shell to 7 mm at the point of transition into the axle shaft.

The metal consumption during roller manufacture decreased 12% approximately (for rollers 250 mm long) and 10% (for those 750 mm long). The labour requirement for manufacture of rollers decreased at least 15%, the prime cost of the roller dropped 24% and the saving in the production areas was at least 16%. The decrease in the roller power requirement gave a 15% yearly reduction of electric energy consumed by the roller.

The conveyors with the rollers according to the invention function identically to the conveyors with the prior art rollers.

In addition, it should be pointed out that the disclosed method can be utilized also for manufacturing driving and driven conveyor drums, sheaves and other similar parts.

The roller according to the present invention can be most advantageously used in conveyors of the belt, roller, belt-and-chain, cable-and-belt, apron and other types.

We claim:

1. A method of manufacturing conveyor rollers having a hollow cylindrical shell with end walls and axle shafts for mounting bearings, wherein the ends of a rotating tubular billet heated to a forging temperature are rolled consecutively until truncated cones are obtained, the method comprising the steps of rolling each end of a tubular billet 12 until a truncated cone 14 is obtained, the smaller base thereof being somewhat larger or equal to the diameter (d) of the roller axle shaft 3; simultaneously forming the axle shaft 3 and the end wall 2 of the roller in the direction from the smaller base of the truncated cone 14 to its larger base while continuing the rolling of each end, the end wall of the roller being of a variable thickness which grows radially into the cylindrical shell 1 from the periphery to its geometrical axis, wherein the truncated cone 14 is rolled by simultaneously forming at last two tapered portions 15, 16 whose generatrices are arranged at different angles ($\phi_1, \phi_2$) to the geometrical axis of the tubular billet 12 and vary in length gradually in the course of rolling; the inclination angle ($\phi_1$) of the generatrix of at least one of said tapered portions to the geometrical axis of the tubular billet 12 is also being changed gradually in the process of forming.

2. A method according to claim 1, wherein the inclination angle ($\phi_1$) of the generatrix of the tapered portion 15 adjoining the nonformed part of the tubular billet is changed gradually to 90° from the value equal to the inclination of the generatrix of the truncated cone 14 whereas the inclination angle ($\phi_2$) of the generatrix of the other tapered portion 16 is left unchanged and equal to the inclination angle of the generatrix or the truncated cone 14.

* * * * *